(12) United States Patent
Richardson

(10) Patent No.: US 9,500,794 B2
(45) Date of Patent: Nov. 22, 2016

(54) LIGHT INTENSIFIER

(71) Applicant: Steven J. Richardson, Valley Stream, NY (US)

(72) Inventor: Steven J. Richardson, Valley Stream, NY (US)

( * ) Notice: Subject to any disclaimer, the term of this patent is extended or adjusted under 35 U.S.C. 154(b) by 148 days.

(21) Appl. No.: 14/579,861

(22) Filed: Dec. 22, 2014

(65) Prior Publication Data

US 2015/0177437 A1 Jun. 25, 2015

Related U.S. Application Data

(60) Provisional application No. 61/919,891, filed on Dec. 23, 2013.

(51) Int. Cl.
| | |
|---|---|
| *F21V 8/00* | (2006.01) |
| *F21V 23/04* | (2006.01) |
| *F21S 8/00* | (2006.01) |
| *F21S 9/04* | (2006.01) |
| *F21V 7/04* | (2006.01) |
| *F21V 5/04* | (2006.01) |
| *F21Y 101/02* | (2006.01) |

(52) U.S. Cl.
CPC ............... *G02B 6/0008* (2013.01); *F21S 8/00* (2013.01); *F21S 9/04* (2013.01); *F21V 23/04* (2013.01); *G02B 6/0096* (2013.01); *F21V 5/04* (2013.01); *F21V 7/04* (2013.01); *F21Y 2101/02* (2013.01)

(58) Field of Classification Search
CPC ............ F21Y 2101/02; G02B 6/0008; G02B 6/0005; G02B 6/0096; G02B 6/0006; G02B 6/0073; G02B 6/4298; F21S 48/1241
See application file for complete search history.

(56) References Cited

U.S. PATENT DOCUMENTS

| | | | | |
|---|---|---|---|---|
| 5,184,883 A * | 2/1993 | Finch | ................... | B60Q 1/0011 362/321 |
| 2004/0149998 A1* | 8/2004 | Henson | ................ | B60Q 1/0011 257/98 |
| 2006/0147161 A1* | 7/2006 | Kim | ..................... | G02B 6/0006 385/89 |
| 2008/0239748 A1* | 10/2008 | Hatzenbuehler | ....... | B60Q 3/005 362/554 |

* cited by examiner

*Primary Examiner* — Peggy Neils
(74) *Attorney, Agent, or Firm* — Kelley Drye & Warren LLP

(57) ABSTRACT

A light intensifier comprising an arrangement and structured collaboration of one or more of fiber optics, acrylic light rods, optical lenses, mirrors, an ignition light source, an ignition power source, and casing. The light intensifier produces a source of light that starts from an initial light source and results in an output of light that is increased in intensity as the sum of all its parts work in unison to form a constantly magnifying looping engine. According to one embodiment, the light intensifier comprises a transmitting panel, a receiving panel, a light source connected to the transmitting panel, a plurality of light guides, and a light output portal connected to the receiving panel. The receiving panel is arranged across of and aligned with the transmitting panel such that the inner surface of the receiving panel faces the inner surface of the transmitting panel. The light source emits a first light beam on the inner surface of the receiving panel. The plurality of light guides receive the light at the receiving panel and transmit the light to the transmitting panel. The light guides emit a plurality of second light beams from the transmitting panel on the inner surface of the receiving panel. The first light beam is combined with the plurality of second light beams. A portion of the combined light beam is emitted out of the light intensifier through the light output portal.

24 Claims, 9 Drawing Sheets

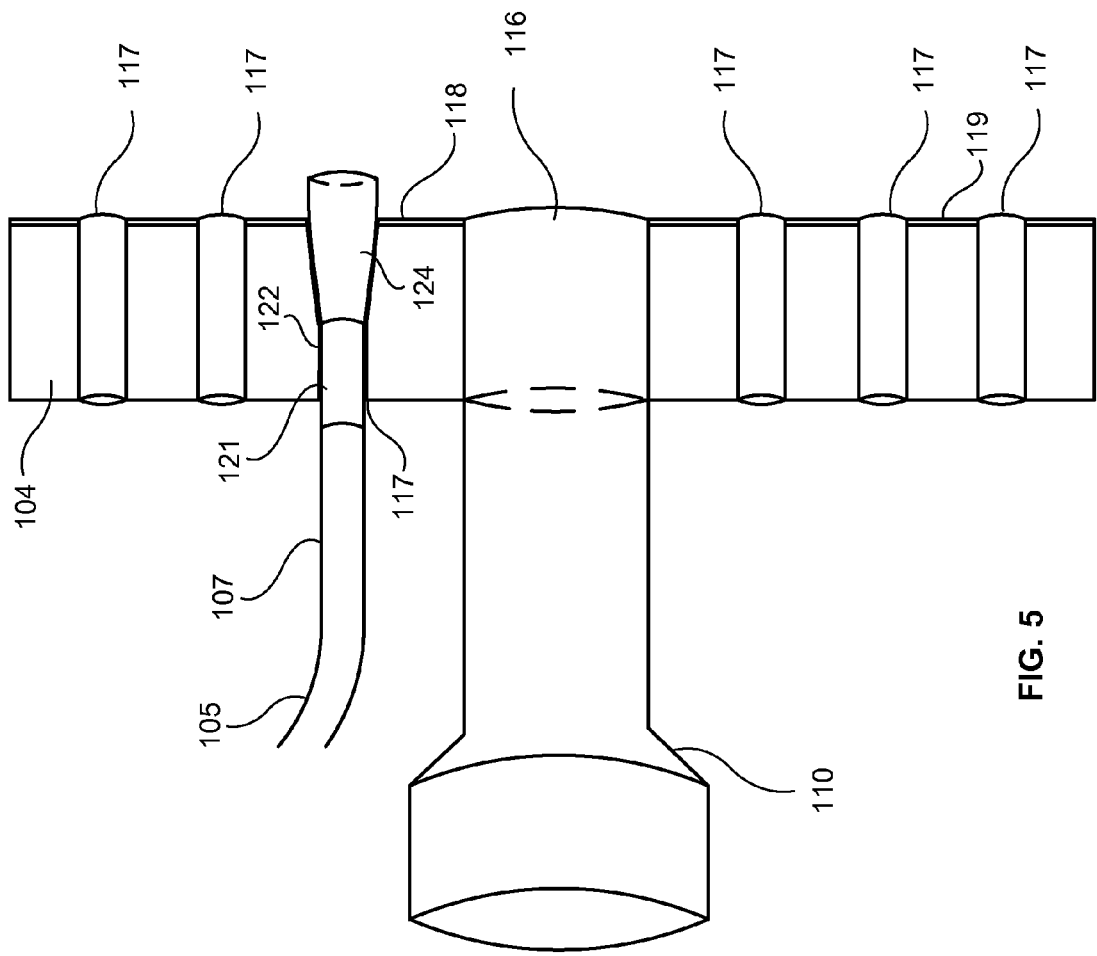
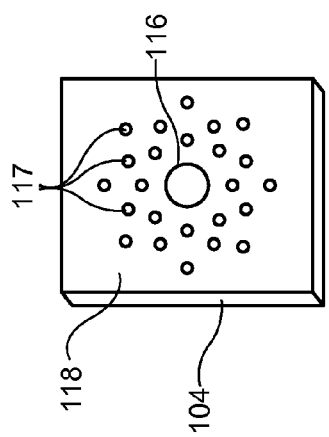
FIG. 4
FIG. 5

LIGHT INTENSIFIER

CROSS-REFERENCE TO RELATED APPLICATIONS

This application claims the benefit of Provisional Application No. 61/919,891, filed Dec. 23, 2013, the entire contents of which are herein incorporated by reference.

FIELD OF THE INVENTION

This invention relates to an improvement in light energy, and specifically to a light intensifier. The light intensifier comprises an arrangement and structured collaboration of one or more of fiber optics, acrylic light rods, optical lenses, mirrors, an ignition light source, an ignition power source, and casing. The light intensifier produces a source of light that starts from an initial light source and results in an output of light that is increased in intensity as the sum of all its parts work in unison to form a constantly magnifying looping engine.

BACKGROUND OF THE INVENTION

Vast amount of energy is consumed by modern civilization. The continual rise in energy costs and environmental concerns result in the continual push to reduce energy consumption, forcing nations to expend considerable resources into energy conservation. Because the utilization of lights is an integral part of the human life, the industry keeps striving to develop more efficient products that save energy, reduce cost, and last for a longer period of time. The U.S. government encourages industries to produce energy efficient light bulbs, awarding energy star certification to products that meet strict energy efficiency guidelines set by the U.S. Environmental Protection Agency. Lighting products that have earned the Energy Star label deliver the same or more amount of light than a conventional incandescent bulb while using less energy.

As a result of these efforts, energy star certified light bulbs were developed, such as light omitting diodes (LEDs) and compact fluorescent lights (CFLs), which use about 70-90% less energy than traditional incandescent bulbs. However, these types of lights might not be desirable in certain applications because of the type of light that is being emitted and because of their technical limitations, such as with dimming. As such, there is still a need to investigate other means for reducing energy consumption.

Accordingly, a need exists for a lighting product that conserves energy, while allowing the utilization of a variety of light source types.

SUMMARY OF THE INVENTION

An object of the invention is to overcome the drawbacks of previous inventions.

Another object of the invention is to provide a novel and useful light intensifier.

Another object of the invention is to provide a source of light that starts from an initial light source, and results in an output of light that is increased in intensity as the sum of all its parts work in unison to form a constantly magnifying looping engine.

Another object of the invention is to provide a light intensifier that utilizes less energy and thereby is safe and efficient.

Another object of the invention is to provide an alternative energy source.

Another object of the invention is to provide a light intensifier comprising an arrangement and structured collaboration of one or more of acrylic light rods, fiber optics, optical lenses, mirrors, an ignition light source, an ignition power source, and casing.

According to one embodiment of the invention, a light intensifier is provided comprising a transmitting panel, a receiving panel, a light source connected to the transmitting panel, a plurality of light guides, and a light output portal connected to the receiving panel. The receiving panel is arranged across of and aligned with the transmitting panel such that the inner surface of the receiving panel faces the inner surface of the transmitting panel. In operation, the light source emits a first light beam on the inner surface of the receiving panel. The plurality of light guides receive the light at the receiving panel and transmit the light to the transmitting panel. The light guides emit a plurality of second light beams from the transmitting panel on the inner surface of the receiving panel. The first light beam is combined with the plurality of second light beams. A portion of the combined light beam is emitted out of the light intensifier through the light output portal.

BRIEF DESCRIPTION OF THE DRAWINGS

A further understanding of the invention can be obtained by reference to a preferred embodiment set forth in the illustrations of the accompanying drawings. Although the illustrated embodiment is merely exemplary of systems and methods for carrying out the invention, both the organization and method of operation of the invention, in general, together with further objectives and advantages thereof, may be more easily understood by reference to the drawings and the following description. The drawings are not intended to limit the scope of this invention, which is set forth with particularity in the claims as appended or as subsequently amended, but merely to clarify and exemplify the invention.

For a more complete understanding of the invention, reference is now made to the following drawings in which:

FIG. 4 is a perspective view of the inner surface of the receiving panel according to an embodiment of the invention;

FIG. 5 is a cross-sectional view of the receiving panel according to an embodiment of the invention;

DETAILED DESCRIPTION OF THE INVENTION

The invention may be understood more readily by reference to the following detailed description of preferred embodiment of the invention. However, techniques, systems, and operating structures in accordance with the invention may be embodied in a wide variety of forms and modes, some of which may be quite different from those in the disclosed embodiment. Consequently, the specific structural and functional details disclosed herein are merely representative, yet in that regard, they are deemed to afford the best embodiment for purposes of disclosure and to provide a basis for the claims herein, which define the scope of the invention. It must be noted that, as used in the specification and the appended claims, the singular forms "a", "an", and "the" include plural referents unless the context clearly indicates otherwise.

The present invention provides a light intensifier that conserves energy, reduces cost, and lasts for a longer period of time. The light intensifier generally comprises an arrangement and structured collaboration of one or more of acrylic light rods, fiber optics, optical lenses, mirrors, an ignition light source, an ignition power source, and casing. The light intensifier produces a sours of light that starts from an initial light source and results in an output of light that is increased in intensity as the sum of all its parts work in unison to form a constantly magnifying looping engine. The light emitted by the light intensifier of the present invention can be used for residential, commercial, or industrial lighting, or to power solar panels. For example, the light intensifier may be used as a kitchen, bedroom, or bathroom light, office light, back yard light, security light, hospital light, school light, office building light, street light, subway light, sporting arena light, etc. For illustrational purposes only, the light intensifier and its parts are described herein as having certain measurements. However, it should be appreciated that the light intensifier may be scaled up or scaled down according to the desired application.

Figure 1:
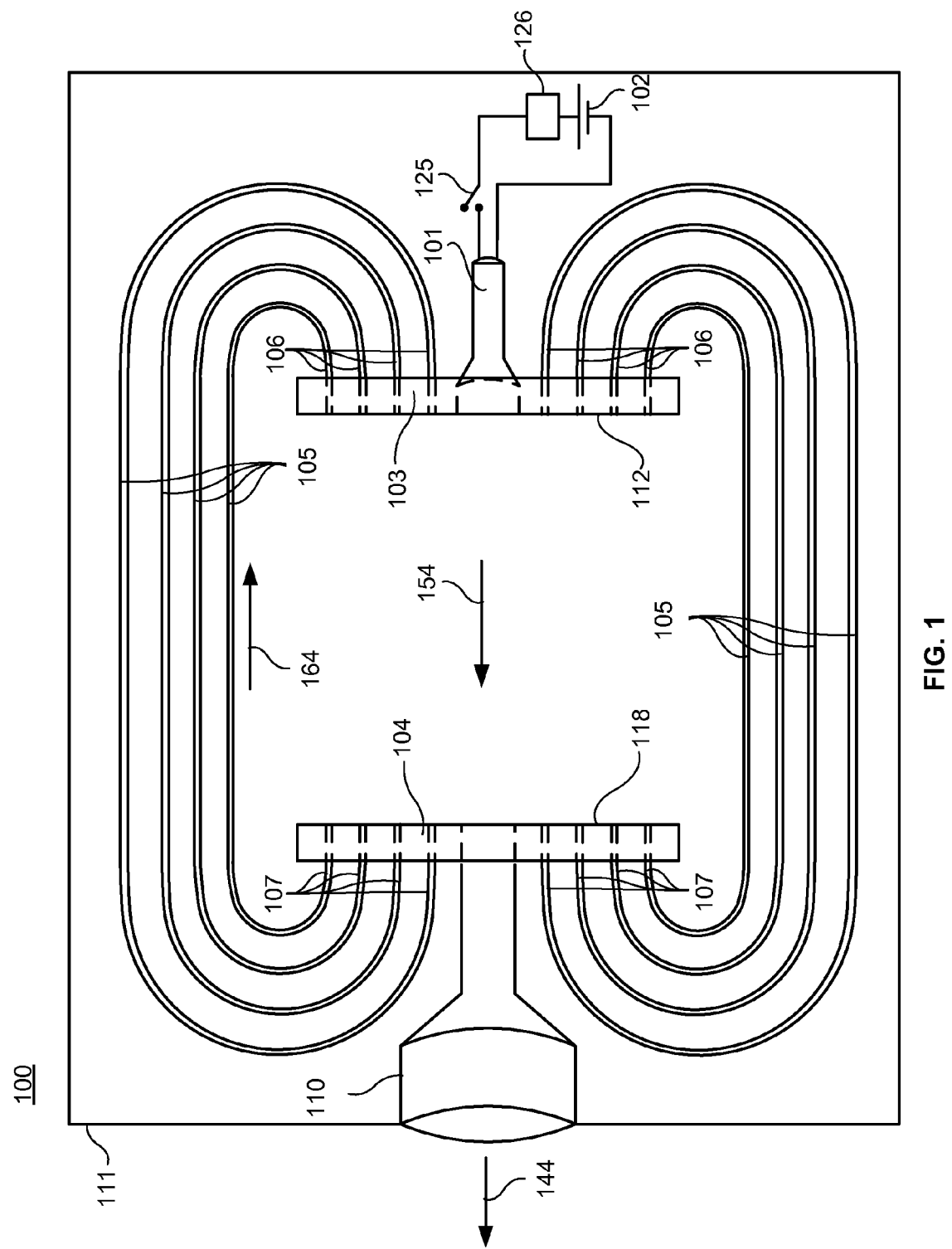
FIG. 1 is a top perspective view of a light intensifier according to an embodiment of the invention.

Referring to FIG. 1, there is shown a top perspective view of the light intensifier 100 according to a preferred embodiment of the invention. Element 101 shows the initial light source used to ignite the intensifier. The light can be emanated from any light emitting device. For example, light source 101 may comprise a flashlight, bulb, lamp, incandescent bulb, halogen light, xenon light, high-intensity discharge (HID) lamp, fluorescent light, compact fluorescent light, a light omitting diode (LED), or any other light emitting device known in the art. Light source 101 preferably comprises a socket for receiving a replaceable light source as is readily known in the art. Element 102 shows a power source electrically connected to the light source 101. Power source 102 may comprise any power supplying device known in the art that will provide power or initial surge of energy to light source 101. For example, power source 102 may comprise a battery, an outlet, a generator, a fuel cell, an alternator, a solar panel, or the like. One or more switch 125 may be used to turn the light source 101 on and off. The switch 125 may be initially switched on by the user who turns the light intensifier 100 on, for example by using an external switch. The switch 125 may thereafter be controlled by a control circuit 126 as will be later describe.

Elements 105 show a plurality of light guides 105, each extending from a receiving end 107 to a transmitting end 106. In a preferred embodiment, the light guides 105 used in the present invention are tubular and comprise a fiber optic cable. However, light guides 105 may comprise any other light transmitting material known in the art or later discovered. For example, light guides 105 may comprise optic light rods, solid acrylic tubes, hollow light tubes lined with reflective material, or the like. Light guides 105 may have a clear plastic coating. In an alternative embodiment, light guides 105 may comprise metal jackets with a rubber outer coating for preventing the light within the light guides from escaping. Light guides 105 may comprise any desired length depending on the application. For example, a 36 inch long light guide 105 may be used. Light guides 105 may have bend flexibility of 180 degrees at 10 inches. This will allow for the maximum return of light within a very small area. Alternatively, or in addition, light guides 105 may be heated and shaped to follow the path illustrated in FIG. 1.

Figure 9:
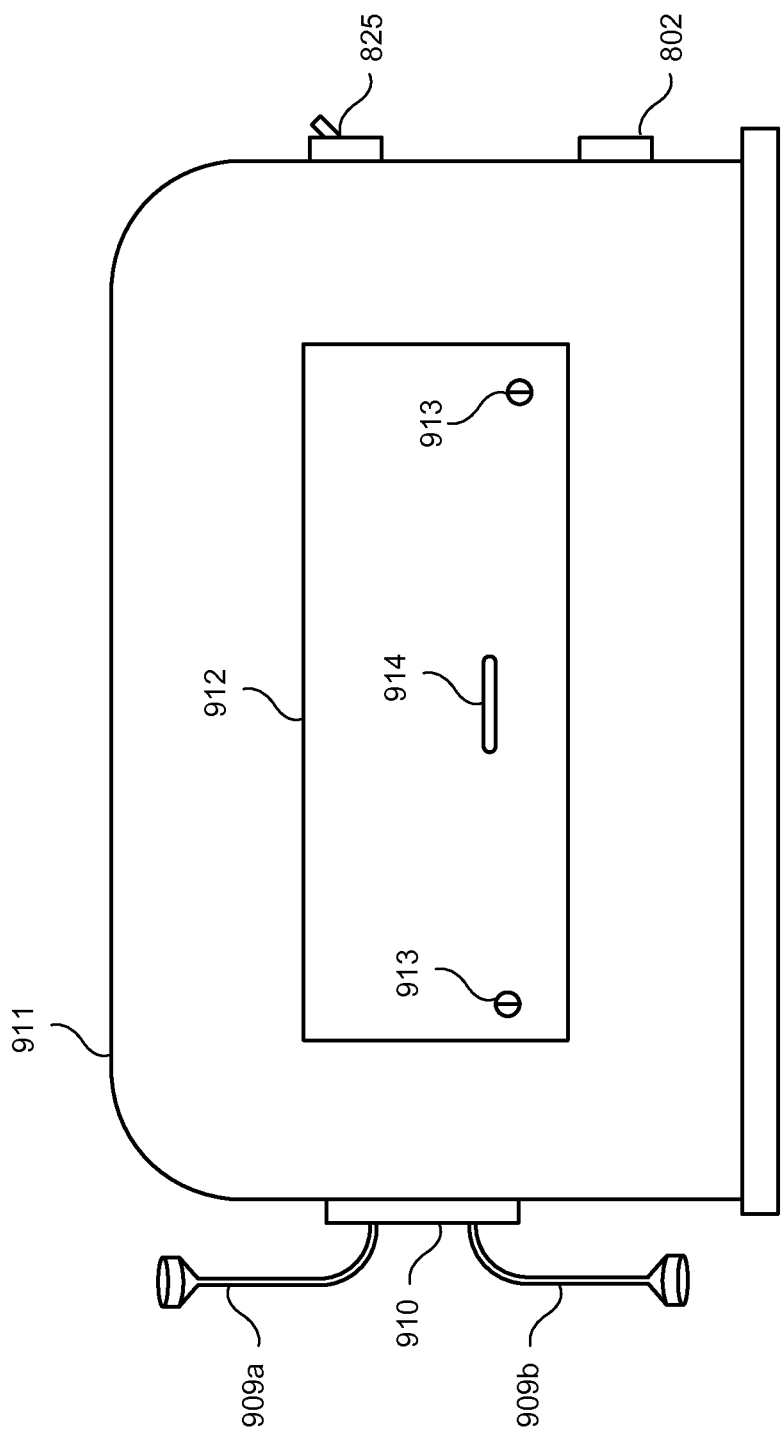
FIG. 9 is a side view of the casing of the light intensifier according to an embodiment of the invention.

Element 103 shows a transmitting panel and element 104 shows the receiving panel. Receiving panel 104 is arranged across of and aligned with the transmitting panel 103 such that the inner surface 118 of the receiving panel 104 faces the inner surface 112 of the transmitting panel 103. The transmitting panel 103 contains the light source 101 at its center and the transmitting ends 106 of the light guides 105. The receiving panel 104 contains the light output portal 110 at its center and the opposite or receiving ends 107 of the light guides 105. The light guides 105 are strategically arranged on the surfaces of the transmitting panel 103 and the receiving panel 104. In a preferred embodiment, at the transmitting panel 103 the light guides 105 are circumferentially arranged about the light source 101. At the receiving panel 104, the light guides 105 are circumferentially arranged about the light output portal 110. The number of light guides 105 needed can vary. Increasing the number of light guides 105 increases the sum of their output. As such, larger scales light intensifier 100 of the present invention can house anywhere between fifty to one hundreds light guides 105. The light guides 105 preferably achieve the same or greater intensity than the light source 101 as will be later described. In a preferred embodiment, the entire light intensifier unit 100 is safely guarded and encased within a casing or cabinet 111, as shown in FIG. 9 and later described.

In operation, as will be described in a greater detail below, light emanates from the light source 101 at the transmitting panel 103 towards the inner facing surface 118 of the receiving panel 104 in direction 154. Light is received at the receiving ends 107 of the light guides 105 at the receiving panel 104. Light guides 105 transmit the light to the transmitting ends 106 at the transmitting panel 103 in direction 164. Then, light emanates from the transmitting ends 106 of the light guides 105 at the transmitting panel 103 towards corresponding receiving ends 107 of the light guides 105 at the inner surface 118 of the receiving panel 104 in direction 154. The resulting source of light is emitted from the light intensifier 100 through the output portal 110 in direction 144. The resulting light source is increased in intensity as the sum of all its parts work in unison to form a constantly magnifying looping engine.

Figure 3:
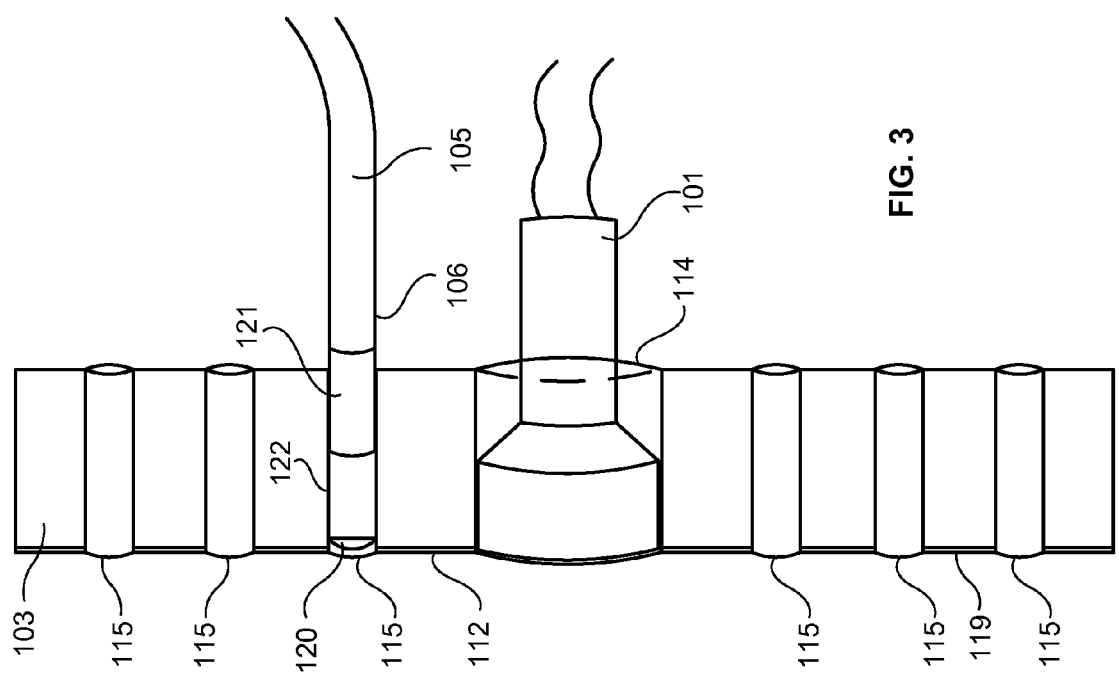
FIG. 3 is a cross-sectional view of the transmitting panel according to an embodiment of the invention.
Figure 2:
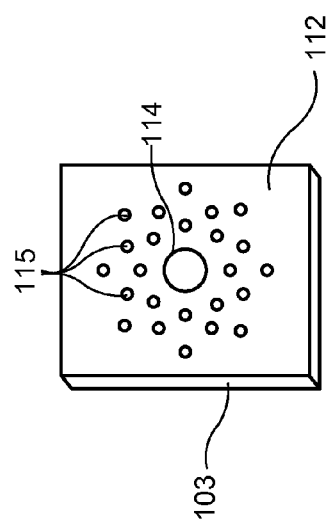
FIG. 2 is a perspective view of the inner surface of the transmitting panel according to an embodiment of the invention.

FIG. 2 illustrates a perspective view of the inner surface 112 of the transmitting panel 103 and FIG. 3 is a cross-sectional view of the transmitting panel 103 that illustrates the transmitting panel 103 in greater detail. In a preferred embodiment, the transmitting panel 103 is made of a light weight alloy. However, other materials may be utilized without departing from the scope of the present invention. In a preferred embodiment the inner surface 112 of the transmitting panel 103 is coated or layered with a reflective mirror 119. The reflective mirror 119 redirects the divergent light back to the receiving ends 107 of the light guides 105, providing increased intensified light output. The transmitting panel 103 may comprise a squared shape as illustrated in FIG. 2, or it may comprise a circular shape, or any other shape known in the art.

Transmitting panel 103 may comprise a main hole or portal 114 that laterally traverses transmitting panel 103 for receiving the light source 101. In a preferred embodiment, main portal 114 is located at the center of the transmitting panel 103. Preferably, light source 101 is aligned with the inner surface 112 of the transmitting panel 103. Light source 101 is focused to shine on substantially the entire inner surface 118 of the receiving panel 104 as will be later described. Transmitting panel 103 further comprises a plurality of transmitting holes or portals 115 that laterally traverse the transmitting panel 103. Main portal 114 and transmitting portals 115 may be formed by precision drilling the transmitting panel 103. Alternatively, the transmitting panel 103 may be molded to contain portals 114 and 115, or portals 114 and 115 may be formed in any other way known in the art. Portals 115 are preferably circumferentially arranged about main portal 114 as shown in FIG. 2. The number of portals 115 included in the transmitting panel 103 is determined by the desired number of light guides 105. The greater the number of light guides 105 the greater the intensity emitted from the transmitting panel 103. The transmitting portals 115 receive the transmitting ends 106 of the light guides 105. As shown in FIG. 3, each light guides 105 may comprise tips 121 on each end. Tips 121 may be precision cut to fit within portals 115. Tips 121 may also be held in place within portals 115 using pressure fitting, threads, glue, or the like.

Each portal 115 further comprises one or more optic lens element 120. Optic lens element 120 is preferably encased in a tube 122 made of plastic or alloy. Tubes 122, tips 121, and optic lens element 120 in turn reside within holes or portals 115. For example, each tube 122 of ¾ inch in diameter may house a light guide 105 that is ½ inches in diameter. Optic lens element 120 preferably comprise one or more lenses that are precisely calibrated and constructed to put out the optimum amount of light at the greatest magnification possible. One or more optic lens elements 120 may be used. In a preferred embodiment, a single plano-convex lens 120 is used. The plano-convex lens 120 is used for collimating the light beam. In one embodiment a 6 mm lens is used that will achieve a 9 inch diameter spot on the receiving panel 104 at a distance of 10 inches. Of course, any other number of lenses, sizes, and lens combinations may be used to achieve desired results. For example, a double convex lens may be use to spot focus the light beam. An aspheric lens may be used to collimate and spot focus the light beam with less aberrations. All these lenses will vary based on the size of the light intensifier unit, which may be either portable or sized for an industrial yard. The lenses may be made of a glass material, or a plastic material.

FIG. 4 illustrates the perspective view of the inner surface 118 of the receiving panel 104 and FIG. 5 is a cross-sectional view of the receiving panel 104 that illustrates the receiving panel 104 in greater detail. The receiving panel 104 may be made from a light weight alloy, or other materials. In a preferred embodiment, the inner surface 118 of the receiving panel 104 is coated or layered with a reflective mirror 119. The reflective mirror 119 redirects the divergent light back to the receiving ends 107 of the light guides 105, providing increased intensified light output. The receiving panel 104 may comprise a square shape or it may comprise a circular shape, or any other shape known in the art.

As shown in FIG. 4, the receiving panel 104 may comprise a main hole or portal 116 in its center for containing the light output portal 110. The receiving panel 104 may further comprise a plurality of receiving holes or portals 117 circumferentially arranged around the main portal 116 for receiving the receiving ends 107 of the light guides 105. In a preferred embodiment, the receiving panel 104 and the transmitting panel 103 comprise the same number of portals for receiving the opposite ends of the light guides 105. Preferably, main portal 114 of the transmitting panel 103 is linearly aligned with the main portal 116 of the receiving panel 104. Similarly, each transmitting portal 115 is linearly aligned with a corresponding receiving portal 117, as shown in FIG. 1.

As shown in FIG. 5, each light guide 105 also comprises a tip 121 on the receiving end 107. The tip 121 may be held in place within portals 117 using precise fitting, pressure fitting, threads, glue, or the like. Each portal 117 may further comprise a compound parabolic concentrator (CPC) 124 connected to tip 121 of each light guide 105. The compound parabolic concentrator 124 is preferably encased in a tube 122 made of plastic or alloy. These tubes 122 and compound parabolic concentrators 124 in turn reside within holes or portals 117. Tubes 122 and portals 117 are preferably shaped to accommodate tips 121 and the shape of the compound parabolic concentrators 124 as shown in FIG. 5. In a preferred embodiment, portals 117 will have a combination of 25 degree and 45 degree compound parabolic concentrators 124 with an exit diameter measurement that equals to the diameter measurement of the light guides 105 used. Compound parabolic concentrators 124 aid in condensing and concentrating any spilled or divergent light back on the receiving ends 107 of the light guides 105. This will capture any critical light that diverged at angles of 25 to 45 degrees.

Figure 6:
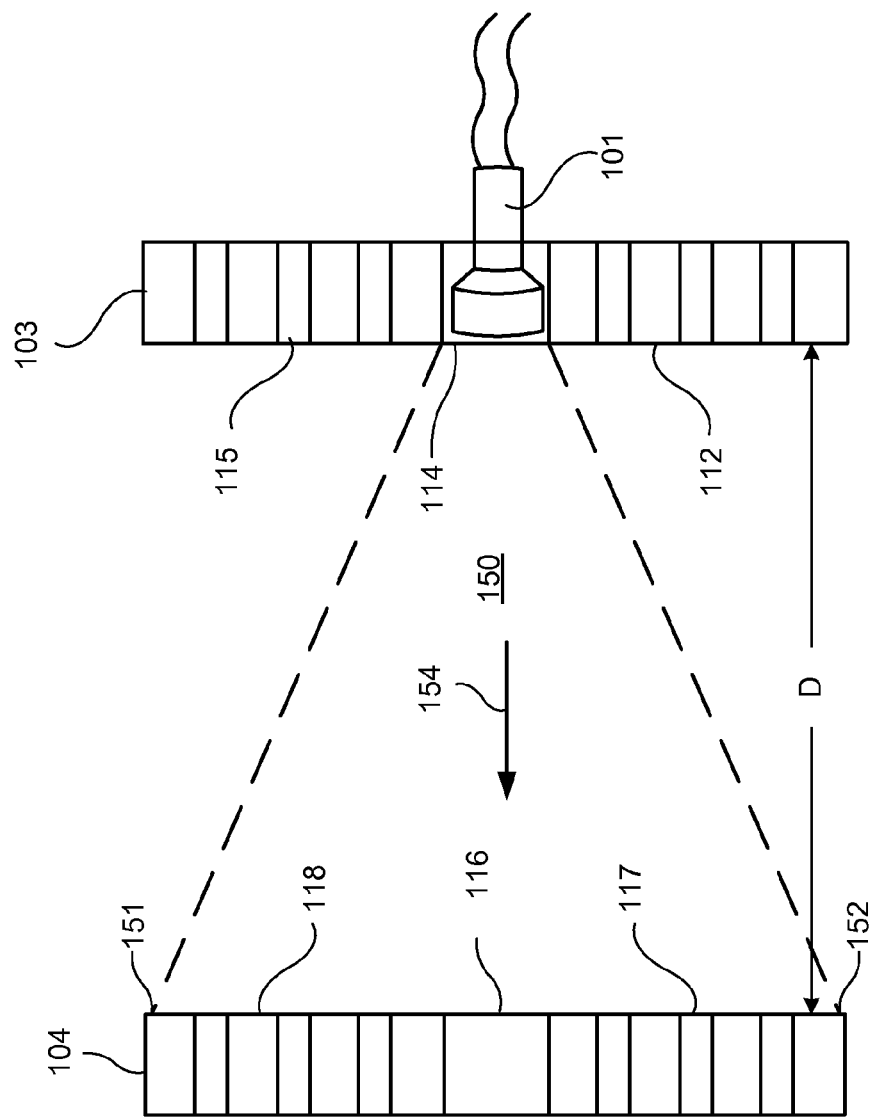
FIG. 6 is a top cross-sectional view of the coverage of the light emitted from a light source on the inner surface of the receiving panel of the light intensifier according to an embodiment of the invention.

FIG. 6 is a side cross-sectional view of the light intensifier 100 illustrating the light beam 150 emitted from the light source 101 in direction 154 on the inner surface 118 of the receiving panel 104. In a preferred embodiment, the transmitting panel 103 is arranged at a distance D with respect to the receiving panel 104 such that the light beam 150 emitted from the light source 101 covers substantially the entire inner surface 118 of the receiving panel 104 between points 151 and 152. Preferably, the light beam 150 spans all the receiving portals 117 on the receiving panel 104, thereby transmitting light to all the receiving ends 107 of light guide 105 connected to the receiving panel 104. For example, transmitting panel 103 and receiving panel 104 may comprise height and width of 10 inches, and be arranged at a distance D of 11 inches. The diameter of light of beam 150 between points 151 and 152 may be 9 inches. The distance D between the light source 101 and the receiving panel 104 will be determined by the size of the parts used to construct the light intensifier 100.

Figure 7:
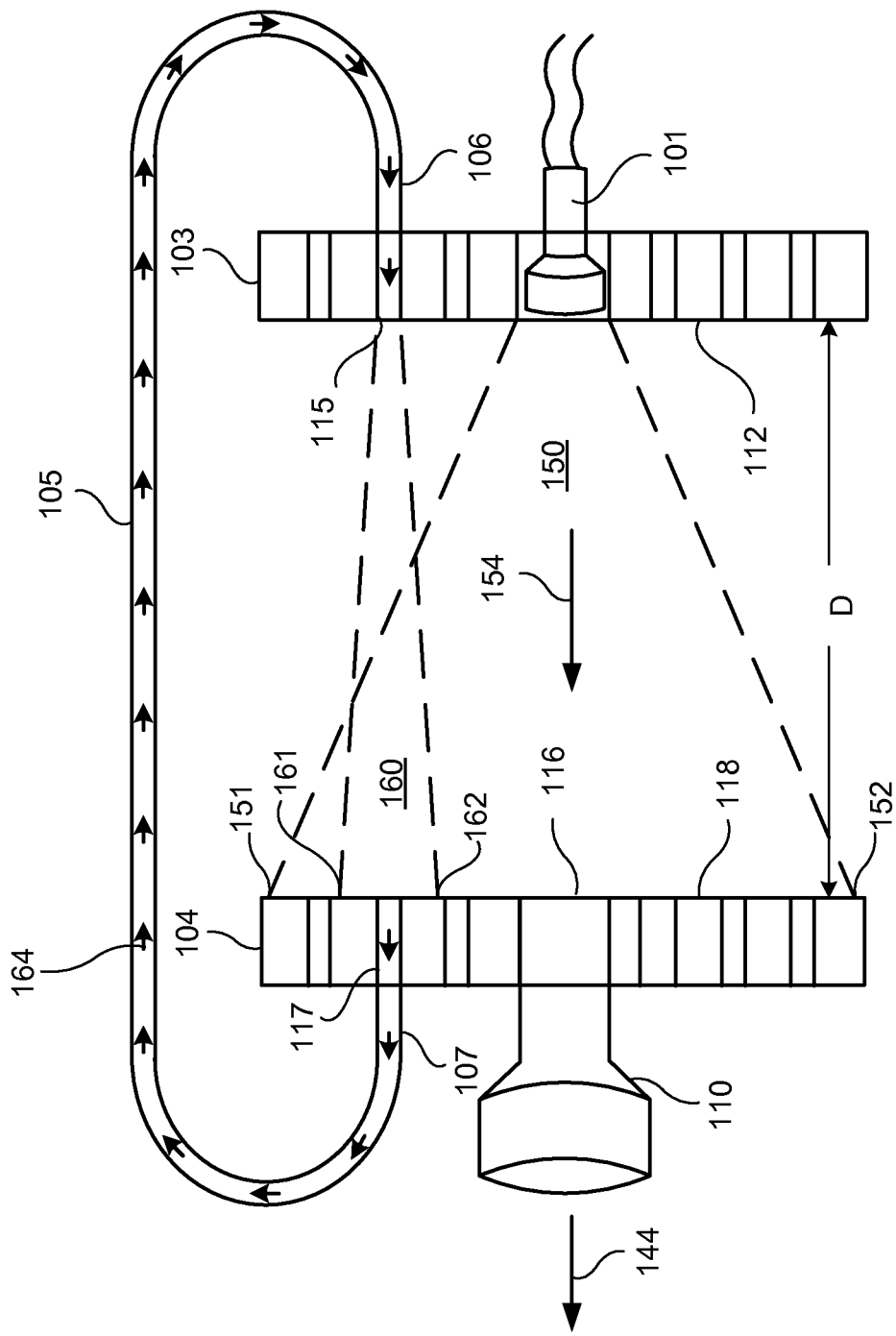
FIG. 7 is a top cross-sectional view of the light intensifier illustrating the light looping engine in operation according to an embodiment of the invention.

FIG. 7 illustrates the side cross-sectional view of the light intensifier 100 in operation. For simple illustration, only one looping engine in motion, consisting of a single light guide 105 is illustrated. Once the light source 101 is turned on using switch 125 (FIG. 1), a process referred to herein as looping engine will begin. First, light beam 150 is emitted in direction 154 from light source 101 that covers substantially the entire inner surface 118 of the receiving panel 104 between points 151 and 152. The looping engine starts when the receiving end 107 of light guide 105 on the receiving panel 104 receives the light from emitted light beam 150 through the compound parabolic concentrator 124 (shown in FIG. 5) at the receiving portal 117. Compound parabolic concentrator 124 aids in condensing and concentrating any spill light out of the target of 9 inches away. Light guide 105 transfers the light in direction 164 to the transmitting end 106 of light guide 105 on the transmitting panel 103. The transmitting end 106 of the light guide 105 that is on the transmitting panel 103 will in synchronization emit light beam 160 through the transmitting portal 115, and thereby through the optic lens element 120 (shown in FIG. 4). The optic lens element 120 magnifies the emitted light beam 160. Light beam 160 is emitted towards the inner surface 118 of the receiving panel 104 between points 161 and 162, towards the receiving portal 117. Referring to the previous example, where the transmitting panel 103 and receiving panel 104 are 10 inches in height and width, and arranged at a distance D of 11 inches, the diameter of spot 160 between points 161 and 162 may be three inches. The intensity of light beam 160 will meet or surpass the intensity of light beam 150. The light of the combined light beams 150 and 160 is received through the receiving portal 117 and transferred in direction 164 through the light guide 105 to the transmitting end 106 of light guide 105 on the transmitting panel 103. This process repeats itself, and the resulting light is emitted through the main portal 116 on the receiving panel 104 and out of the light intensifier 100 through the light output portal 110 in direction 144.

It was discovered through experimentation that achieving a greater intensity from the transmitting panel 103 makes for a clean and uninterrupted looping process. Once the looping engine engages, the looping engine in motion requires no assistance from the light source 101 any longer for some period of time. As such, the light source 101 can then be turned off. The only thing that was required from the light source 101 was its initial burst of luminance. Once that luminance is captured in the loop, the feed from the light source 101 can be eliminated. When and if necessary, the light source 101 can be turned back on to provide additional bursts of luminance to continue the looping engine motion. The resulting light is therefore continuously emitted through light output portal 110.

The light source 101 can be turned off and back on by the light switch 125 controlled by the control circuit 126 (FIG. 1). The control circuit 126 may comprise a timer that turns off the light switch 125 after a first predetermined period of time. The light source 101 can then be turned back on by the control circuit 126 after a second period of time. This process may repeat itself until the user of the light intensifier turns the light intensifier 100 off. In another embodiment, the control circuit 126 may be connected to a light sensor that senses the amount of light emitted out of the output portal 110, the amount of light emitted through light beam 160, the amount of light received at or transmitted out of the receiving portal 117, the amount of light traveling through light guides 105, the amount of light received at or transmitted out of the receiving portal 115, or the like. If the sensed amount of light falls below a certain first threshold value, the control circuit 126 may direct the switch 125 to turn the light source 101 on. Light source 101 may be switched on for a certain predetermined period of time, or until the light sensor senses an amount of light that exceeds a certain second threshold value, at which stage, the control circuit 126 will direct the switch 125 to turn the light source 101 off.

Figure 8:
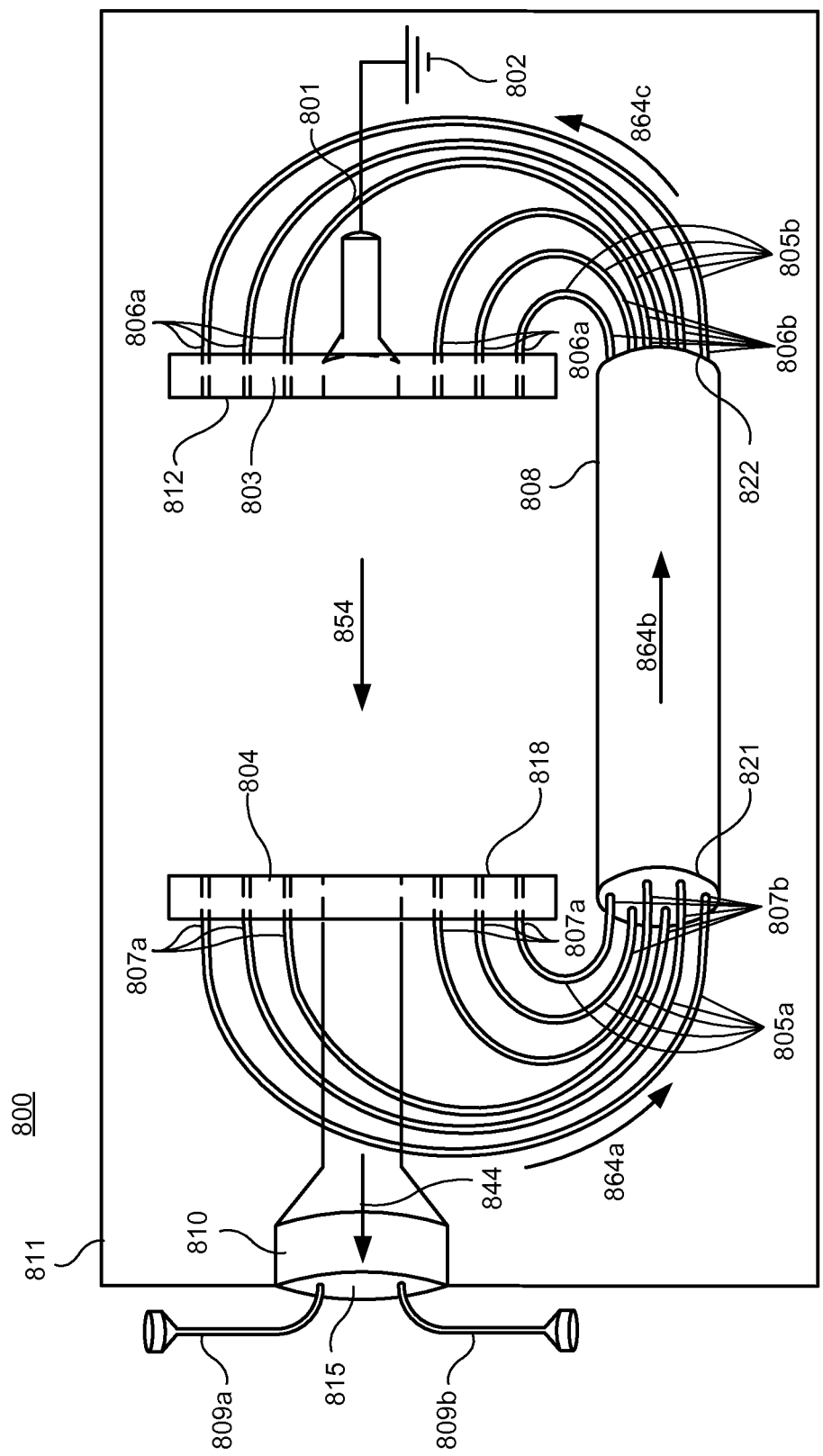
FIG. 8 is a top perspective view of the light intensifier using a solid core rod according to another embodiment of the invention.

FIG. 8 illustrates a top perspective view of a light intensifier 800 according to another embodiment of the invention. Light intensifier 800 is generally similar to light intensifier 101.

Light intensifier 800 comprises initial light source 801 and power source 802 electrically connected to the light source 801. Light intensifier 800 further comprises a transmitting panel 803 and a receiving panel 804 linearly arranged across the transmitting panel 803, such that the inner surface 818 of the receiving panel 804 faces the inner surface 812 of the transmitting panel 803. The transmitting panel 803 contains the light source 801 at its center and a plurality of receiving portals, as previously described, which may comprise compound parabolic concentrators. Receiving panel 804 contains a light output portal 810 at its center and a plurality of transmitting portals, as previously described, which may comprise optical lenses. Light intensifier 800 further comprises a plurality of light guides—receiving light guides 805a and transmitting light guides 805b, which may be made of fiber optic cable. Each of the receiving light guides 805a extends from a receiving end 807a contained within the receiving panel 804 to a second end 807b. Each of the transmitting light guides 805b extends from a transmitting end 806a contained within the transmitting panel 803 to a second end 806b. The light guides 805a and 805b are preferably circumferentially arranges on the receiving panel 804 and transmitting panel 803, respectively. As previously indicated, the number of light guides 805a and 805b needed can vary depending on the size of the light intensifier 800.

The light intensifier 800 in FIG. 8 further comprises a tubular light rod 808 extending from a first end 821 to a second end 822. Light rod 808 preferably comprises a rigid and solid core made of clear plastic material, such as acrylic. It has been discovered that using a single tubular light rod 808 assists in lowering the cost of the unit without compromising its effectiveness. Light rod 808 may be coated with an opaque material to prevent light from escaping light rod 808. As an example, light rod 808 may comprise 4 inch in diameter. However, light rod 808 may comprise larger or smaller diameter depends on the size of the light intensifier unit 800. Light rod 808 is connected to the light guides 805a and 805b to transmit the light from the receiving panel 804 back to the transmitting panel 803. Specifically, second ends 807b of the receiving light guides 805a are connected to the first end 821 of the light rod 808. Second ends 806b of the transmitting light guides 805a are connected to the second end 822 of the light rod 808. The entire light intensifier unit 800 is encased within casing 811. Although a single light rod is shown, it should be appreciated that the number of light rods may be increased.

In operation, light is emitted in direction 854 from light source 801 that covers substantially the entire inner surface 818 of the receiving panel 804. The looping engine starts when the receiving ends 807a of the receiving light guides 805a on the receiving panel 804 receive the light. Light guides 805a transfer the light from their receiving ends 807a to their second ends 807b to the light rod 808 in direction 864a. The light from the receiving light guides 805a is combined in the light rod 808 into a single beam. The single beam of light is transmitted from the first end 821 to the second end 822 of the light rod 808 in direction 864b. The light exists second end 822 through transmitting light beams 805b. Then, light is transmitted from the second ends 806b to the transmitting ends 806a of the transmitting light beams 805b in direction 864c. As previously described, the transmitting ends 806a of the transmitting light guides 805b will in synchronization emit light beams towards the inner surface 818 of the receiving panel 804 in direction 854. Light emitted from the light source 802 is combined with the light emitted from the transmitting ends 806a and again goes in a loop through light guides 805a and 805b and the light rod 808, and the process repeats. The resulting light is emitted out of the light intensifier 800 through the light output portal 810 in direction 844. As shown in FIG. 8, light output portal 810 may be covered by cover 815. The light may be emitted through one or more output lamps 809a and 809b to provide a plurality of light sources for the same or different areas.

Light intensifier units 100 and 800 may be entirely encased within casing or cabinet 911 shown in FIG. 9. Casing 911 may be made of light weight alloy, composite plastic, weather resistance plastic, or the like. Preferably, casing 911 comprises an opaque material that prevents the transmittal of light through the walls of the casing. The only item that may be visible from the outside of the casing may be the output light portal 910. Portal 910 may be embodied as an opening shown as element 110 in FIG. 1, or covered light portal 810 shown in FIG. 8, which comprises one or more output lamps 909a and 909b. Casing 911 may comprise external power inlet 802. Alternatively, casing 911 may comprise a power plug connected to a power cable that leads to the light source 101 within the casing 911. An external switch 825 may be provided to turn the light intensifier on and off. Casing 111 may further comprise one or more access portals, such as door access panel 912, for maintenance purposes of the inner components of the light intensifier. For example, door access panel 912 may be used to change the light source 101. Door access panel 912 may comprise safety locks 913 to lock the panel, and a handle 914 to assist in removing or opening the panel. This casing 911 may comprise varying sizes based on the size of the light intensifier needed. The casing 911 can be placed indoors or outdoors, on a roof or in a back yard. The casing 911 can be placed in a room or become a room itself. The casing 911 can be buried or suspended. Further, the casing 911 can be a personal portable device or become part of a multiple of units forming an industrial power yard.

Figure 10:
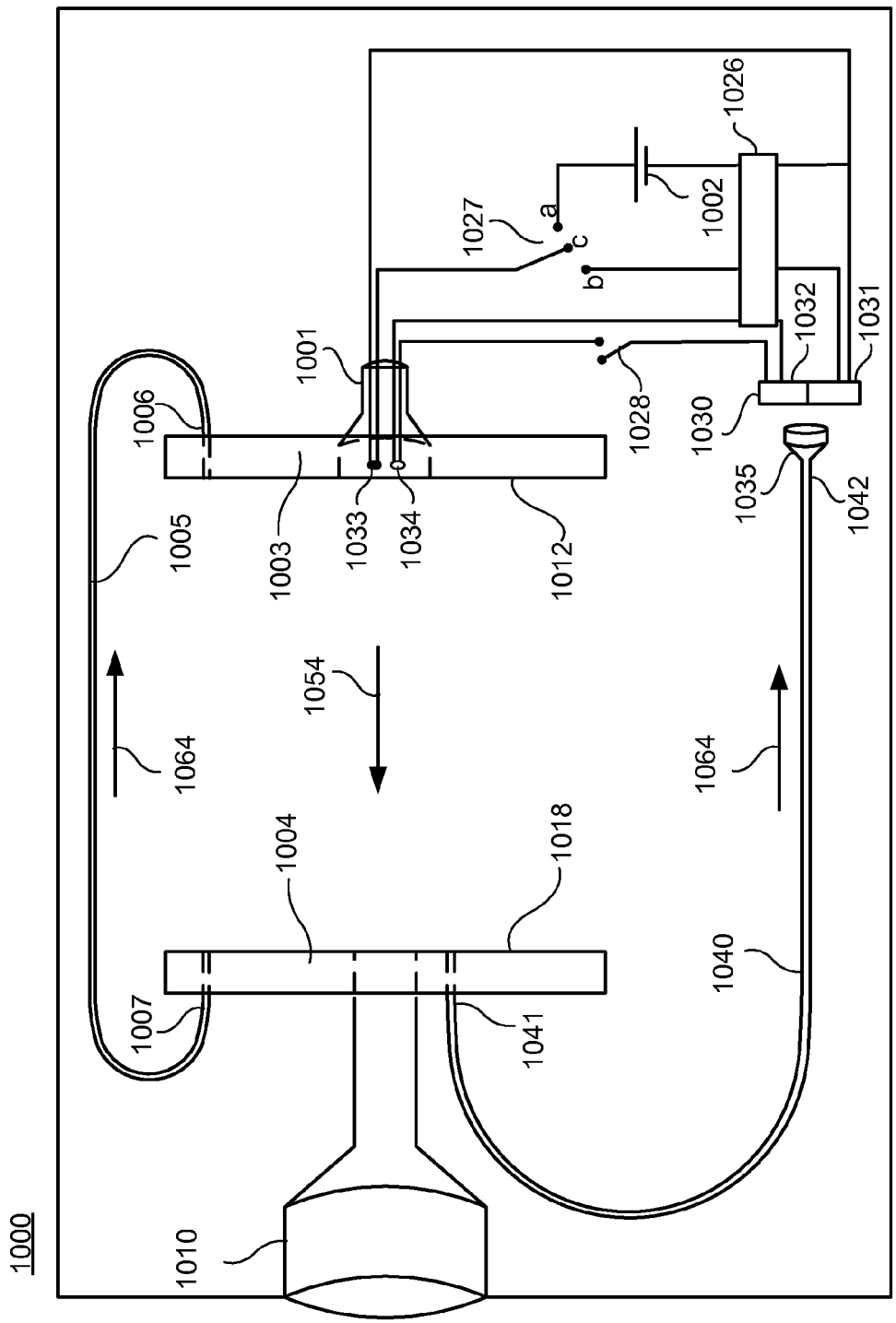
FIG. 10 is a top perspective view of a light intensifier with a light source according to an alternative embodiment of the invention.
Figure 12:
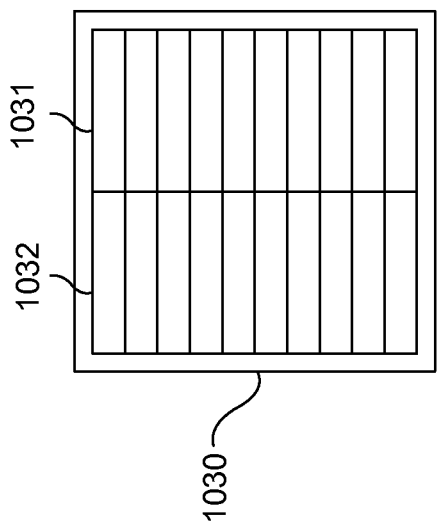
FIG. 12 is a front view of the inner surface of a solar panel according to an alternative embodiment of the invention.
Figure 11:
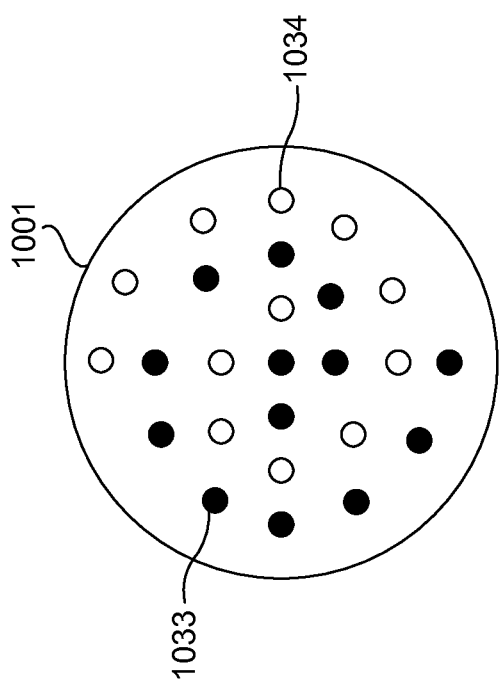
FIG. 11 is a front view of the inner surface of the light source according to an alternative embodiment of the invention.

FIG. 10 illustrates a top perspective view of light intensifier 1000 with a light source 1001 according to an alternative embodiment of the invention. FIG. 11 illustrates the front view of the inner surface of the light source 1001. Light intensifier 1000 comprises similar general structure and components as light intensifier 100 of FIG. 1, including a power source 1002, a transmitting panel 1003, a receiving panel 1004, a light output portal 1010, and a plurality of light guides 1005 (only a single light guide is illustrated for exemplary purposes). The light source 1001 according to this embodiment, as shown in FIG. 11, comprises a first group of plurality of LEDs 1033 and a second group of plurality of LEDs 1034. The first and second groups of LEDs 1033 and 1034 may be arranged symmetrically in a swirl pattern with respect to each other. However, they may be arranged in any other configuration on the face of the light source 1001. Preferably, the first group of LEDs 1033 operates independently of the second group of LEDs 1034. Light intensifier 1000 further comprises one, two, or more additional light guides 1040 each extending from a first end 1041 to a second end 1042. Again, only a single light guide 1040 is illustrated for exemplary purposes. First ends 1041 of light guides 1040 are connected to the receiving panel 1004. The second ends 1042 of the light guides are connected to output lamps 1035. A three way switch 1027 and a two way switch 1028 are provided, which are controlled by control circuit 1026. Two way switch 1028 is switched between open and closed positions, and three way switch 1027 is switched between positions (a), (b), and (c). Light intensifier 1000 further comprises a solar panel 1030, the inner surface of which is illustrated in FIG. 12. Solar panel 1030 may comprise amorphous solar cells divided in two halves that are configured to put out the same output voltage and amperage as power source 1002. First half 1031 of solar panel 1030 is electrically connected via three way switch 1027 to the first group of LEDs 1033, and second half 1032 is electrically connected via switch 1028 to the second group of LEDs 1034. First group of LEDs 1033 are further electrically connected via the three way switch 1027 to the power source 1002.

In operation, to turn the light intensifier 1000 on, switch 1028 closes and switch 1027 switched from an open position (c) to a closed position (a) to connect the first group of LEDs 1033 with the power source 1002. Power source 1002 powers first group of LEDs 1033, which emit a first light beam toward the receiving panel 1004 in direction 1054. The first light beam travels through light guides 1005 as previously described. The first light beam is further received by the additional light guides 1040 at first end 1041 and travels in direction 1064 towards the output lamp 1035 at the second end 1042. A light beam is emitted from the output lamp 1035 toward the solar panel 1030, causing the solar panel 1030 to generate electricity. Although a single output lamp 1035 and single light guide 1040 are illustrated, two separate additional light guides and output lamps may be used, each for powering the respective of the two halves 1031 and 1032 of the solar panel 1030. Power from second half 1032 of solar panel 1030 travels to and turns on the second group of LEDs 1034. Then, switch 1027 is switched from position (a) to position (b), to disconnect the first group of LEDs 1033 from the power source 1002 and connect them with the solar panel 1030. Power from first half 1031 of solar panel 1030 ravels to and turns on the first group of LEDs 1033. At this point all lights of light source 1001 are on and being powered by the internal amorphous solar cells of solar panel 1030. Power source 1002 power is eliminated and will remain on standby for backup purposes. Switch 1027 may be switched to position (a) by control circuit 1026 when additional energy is required. Light intensifier operates similar as described with respect to FIG. 1 to emit the resulting light through light output portal 1010.

It should be appreciated that the present invention can be conformed to any size just by increasing the size and measure of any of the parts incorporated within. By increasing the size of the light source 101, light guides 105 diameter and/or number, optical lenses 120 size, compound parabolic concentrators 124 size, number, and/or focal distances, light rod 808, and/or transmitting and receiving panel sizes and distance, a light intensifier of greater capability will be created.

While the invention has been described with reference to the preferred embodiment and alternative embodiments, which embodiments have been set forth in considerable detail for the purposes of making a complete disclosure of the invention, such embodiments are merely exemplary and are not intended to be limiting or represent an exhaustive enumeration of all aspects of the invention. Further, it will be apparent to those of skill in the art that numerous changes may be made in such details without departing from the spirit and the principles of the invention. It should be appreciated that the invention is capable of being embodied in other forms without departing from its essential characteristics.

What is claimed is:

1. A light intensifier comprising:
   a transmitting panel;
   a receiving panel arranged across of and aligned with the transmitting panel such that an inner surface of the receiving panel faces an inner surface of the transmitting panel;
   a light source connected to the transmitting panel, wherein the light source emits a first light beam on the inner surface of the receiving panel;
   a power source electrically connected to the light source;
   a plurality of light guides that receive light at the receiving panel and transmit light to the transmitting panel, wherein the light guides emit a plurality of second light beams from the transmitting panel on the inner surface of the receiving panel, wherein the first light beam is combined with the plurality of second light beams; and
   a light output portal connected to the receiving panel, wherein a portion of the combined first light beam and plurality of second light beams is emitted out of the light intensifier through the light output portal.

2. The light intensifier of claim 1, wherein the light source comprises at least one selected from the group consisting of a flashlight, a bulb, a lamp, an incandescent bulb, a halogen light, a xenon light, a high-intensity discharge lamp, a fluorescent light, a compact fluorescent light, a light omitting diode, or any combination thereof.

3. The light intensifier of claim 1 further comprising a switch that turns the light source on and off, wherein the switch is controlled by a control circuit that controls the switch by using a timer or a light sensor.

4. The light intensifier of claim 1, wherein each light guide extends from a receiving end connected to the receiving panel to a transmitting end connected to the transmitting panel.

5. The light intensifier of claim 4, wherein the first light beam and the plurality of second light beams are received at the receiving ends of the light guides at the receiving panel.

6. The light intensifier of claim 1, wherein the plurality of light guides are tubular.

7. The light intensifier of claim 1, wherein the plurality of light guides are selected from the group consisting of fiber optic cable, optic light rods, solid acrylic tubes, hollow light tubes lined with reflective material, or any combination thereof.

8. The light intensifier of claim 1, wherein the plurality of light guides comprise clear plastic coating, opaque coating, metal jackets, rubber coating, or any combination thereof.

9. The light intensifier of claim 1, wherein the transmitting panel comprises the light source at its center and receiving ends of the plurality of light guides arranged circumferentially about the light source.

10. The light intensifier of claim 1, wherein the receiving panel comprises the light output portal at its center and transmitting ends of the plurality of light guides arranged circumferentially about the light output portal.

11. The light intensifier of claim 1, further comprising a reflective mirror layer on the receiving panel, on the transmitting panel, or on both the receiving and the transmitting panels.

12. The light intensifier of claim 1, wherein the transmitting panel comprises a main portal that laterally traverses the transmitting panel and that receives the light source.

13. The light intensifier of claim 1, wherein the receiving panel comprises a main portal that laterally traverses the receiving panel and that receives the light output portal.

14. The light intensifier of claim 1, wherein light source is focused to emit the first light beam on substantially the entire inner surface of the receiving panel.

15. The light intensifier of claim 1, wherein the transmitting panel comprises a plurality of transmitting portals that laterally traverse the transmitting panel, wherein the receiving panel comprises a plurality of receiving portals that laterally traverse the receiving panel, wherein the transmitting portals and the receiving portals receive the opposite ends of the plurality of light guides, wherein the receiving panel and the transmitting panel comprise the same number of portals, and wherein each transmitting portal is linearly aligned with a corresponding receiving portal.

16. The light intensifier of claim 15, wherein each transmitting portal comprises an optic lens through which each second light beam is emitted, each optic lens magnifies the light it receives from the receiving panel through the light guide.

17. The light intensifier of claim 16, wherein the optic lens comprises a plano-convex lens, a double convex lens, an aspheric lens, or any combination thereof.

18. The light intensifier of claim 15, wherein each receiving portal comprises a compound parabolic concentrator that condenses and concentrates any spilled or divergent light.

19. The light intensifier of claim 1, wherein the light source is turned off for a period of time while the light intensifier continues to emit light through the light output portal.

20. The light intensifier of claim 1 further comprising a tubular light rod extending from a first end to a second end, wherein the first end of the light rod is connected to the plurality of light guides extending from the receiving panel, and wherein the second end of the light rod is connected to the plurality of light guides extending from the transmitting panel.

21. The light intensifier of claim 20, wherein the light rod comprises a rigid and solid core made of clear plastic material.

22. The light intensifier of claim 1 further comprising:
   the light source comprising a first group of LEDs and a second group of LEDs;
   an additional light guide extending from a first end connected to the receiving panel to a second end connected to an output lamp;
   a solar panel comprising a first half electrically connected to the first group of LEDs and a second half electrically connected to the second group of LEDS;
   a switch having a first position and a second position, wherein the first position electrically connects the first group of LEDs with the power source causing the first group of LEDs to emit the first light beam, wherein the additional light guide receives the first light beam at the first end and transmits it to the second end to the output lamp, wherein the output lamp emits a third light beam to the solar panel, wherein the second half of the solar panel turns on the second group of LEDs, wherein the second position disconnects the first group of LEDs from the power source and connect the first group of LEDs with the solar panel, wherein the first half of the solar panel powers the first group of LEDs.

23. A light intensifier comprising:
   a light source;
   a plurality of light guides extending from receiving ends to transmitting ends;

a transmitting panel containing the light source at it center and the transmitting ends of the plurality of light guides arranged about the light source; and a receiving panel arranged across of and aligned with the transmitting panel such that an inner surface of the receiving panel faces an inner surface of the transmitting panel, the receiving panel containing a light output portal at its center and the receiving ends of the plurality of light guides arranged about the light output portal;

wherein the light source emits a first light beam on the inner surface of the receiving panel, wherein the receiving ends receive the first light beam and transmit light to the transmitting ends of the plurality of light guides, wherein the transmitting ends of the plurality of light guides emit a plurality of second light beams from the transmitting panel on the inner surface of the receiving panel, wherein the first light beam is combined with the plurality of second light beams, wherein the combined light is received at the receiving ends of the plurality of light guides, and wherein a portion of the combined light is emitted out of the light intensifier through the light output portal.

24. A light intensifier comprising:

a light source;

a plurality of receiving light guides extending from receiving ends to second ends of the plurality of receiving light guides;

a plurality of transmitting light guides extending from transmitting ends to second ends of the plurality of transmitting light guides;

a transmitting panel containing the light source at it center and the transmitting ends of the plurality of transmitting light guides arranged about the light source;

a receiving panel arranged across of and aligned with the transmitting panel such that an inner surface of the receiving panel faces an inner surface of the transmitting panel, the receiving panel containing a light output portal at its center and the receiving ends of the plurality of receiving light guides arranged about the light output portal; and a tubular light rod extending from a first end to a second end, wherein the first end of the light rod is connected to the second ends of the plurality of receiving light guides, wherein the second end of the light rod is connected to the second ends of the plurality of transmitting light guides;

wherein the light source emits a first light beam on the inner surface of the receiving panel, wherein the receiving ends of the plurality of receiving light guides receive the first light beam and transmit light through the plurality of receiving light guides, the tubular light rod, and the plurality of transmitting light guides to the transmitting ends of the plurality of transmitting light guides, wherein the transmitting ends of the plurality of transmitting light guides emit a plurality of second light beams from the transmitting panel on the inner surface of the receiving panel, wherein the first light beam is combined with the plurality of second light beams, wherein the combined light is received at the receiving ends of the plurality of receiving light guides, and wherein a portion of the combined light is emitted out of the light intensifier through the light output portal.

* * * * *